(12) United States Patent
Oliver et al.

(10) Patent No.: US 9,465,847 B2
(45) Date of Patent: *Oct. 11, 2016

(54) METHODS AND SYSTEMS FOR OPTIMIZING TEXT SEARCHES OVER STRUCTURED DATA IN A MULTI-TENANT ENVIRONMENT

(75) Inventors: Kevin Oliver, San Francisco, CA (US); Scott Hansma, San Francisco, CA (US); Craig Weissman, San Francisco, CA (US); Paul Nakada, San Francisco, CA (US); Jeanine Walters, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 69 days.

This patent is subject to a terminal disclaimer.

(21) Appl. No.: 13/589,011

(22) Filed: Aug. 17, 2012

(65) Prior Publication Data

US 2012/0310931 A1 Dec. 6, 2012

Related U.S. Application Data

(63) Continuation of application No. 13/292,025, filed on Nov. 8, 2011, and a continuation of application No. 13/292,011, filed on Nov. 8, 2011, said application No. 13/292,025 is a continuation of application No. 11/293,857, filed on Dec. 2, 2005, said application No. 13/292,011 is a continuation of application No. 11/293,857, filed on Dec. 2, 2005.

(51) Int. Cl.
*G06F 17/30* (2006.01)

(52) U.S. Cl.
CPC ..... *G06F 17/3053* (2013.01); *G06F 17/30286* (2013.01); *G06F 17/30386* (2013.01); *G06F 17/30424* (2013.01)

(58) Field of Classification Search
CPC .......... G06F 17/30861; G06F 17/30902; G06F 17/30286; G06F 17/30386; G06F 17/3053; G06F 17/30457
See application file for complete search history.

(56) References Cited

U.S. PATENT DOCUMENTS

| | | | |
|---|---|---|---|
| 5,577,188 | A | 11/1996 | Zhu et al. |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |

(Continued)

OTHER PUBLICATIONS

"Multiple-tenancy policy server". IBM Tivoli Access Manager Base Administration Guide, Version 5.1, Nov. 2003.*

(Continued)

*Primary Examiner* — Alicia Willoughby

(57) ABSTRACT

Search systems and methods for searching structured data and enhancing the relevancy of search results provided to a requesting user or application. Enhanced search results are provided by searching a cache of a user's most recently used items to eliminate or reduce search indexing latency. Also, more relevant search results are provided by re-ranking results based on use history, data security models and/or hierarchical user role models. Further, enhanced search results are provided by including user information in the search index.

17 Claims, 10 Drawing Sheets

(56) References Cited

U.S. PATENT DOCUMENTS

| | | |
|---|---|---|
| 5,873,096 A | 2/1999 | Lim et al. |
| 5,873,100 A * | 2/1999 | Adams et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 * | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner |
| 6,850,895 B2 | 2/2005 | Brodersen et al. |
| 6,850,949 B2 | 2/2005 | Warner et al. |
| 7,047,281 B1 * | 5/2006 | Kausik ............ 709/213 |
| 7,062,502 B1 | 6/2006 | Kesler |
| 7,069,231 B1 | 6/2006 | Cinarkaya et al. |
| 7,181,758 B1 | 2/2007 | Chan |
| 7,240,046 B2 * | 7/2007 | Cotner et al. ............ 707/769 |
| 7,254,580 B1 * | 8/2007 | Gharachorloo et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,711,750 B1 | 5/2010 | Dutta et al. |
| 7,747,644 B1 | 6/2010 | Reihl et al. |
| 7,779,039 B2 | 8/2010 | Weissman et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,224,870 B1 * | 7/2012 | Dingle ............ 707/803 |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0009444 A1 | 1/2003 | Eidler et al. |
| 2003/0018705 A1 | 1/2003 | Chen et al. |
| 2003/0018830 A1 | 1/2003 | Chen et al. |
| 2003/0055972 A1 * | 3/2003 | Fuller et al. ............ 709/226 |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0095139 A1 * | 5/2003 | Davidsson ............ 345/700 |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0210909 A1 * | 10/2004 | Dominguez et al. ......... 719/316 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0071741 A1 * | 3/2005 | Acharya et al. ............ 715/500 |
| 2005/0091098 A1 | 4/2005 | Brodersen et al. |
| 2005/0131866 A1 * | 6/2005 | Badros et al. ............ 707/3 |
| 2005/0203888 A1 * | 9/2005 | Woosley et al. ............ 707/3 |
| 2005/0223022 A1 | 10/2005 | Weissman et al. |
| 2006/0021019 A1 | 1/2006 | Hinton et al. |
| 2006/0047635 A1 | 3/2006 | Kraenzel et al. |
| 2006/0047643 A1 * | 3/2006 | Chaman ............ 707/3 |
| 2006/0204142 A1 * | 9/2006 | West et al. ............ 382/305 |
| 2006/0242327 A1 * | 10/2006 | Knight et al. ............ 709/248 |
| 2007/0016553 A1 * | 1/2007 | Dumais et al. ............ 707/2 |
| 2007/0022082 A1 * | 1/2007 | Azagury et al. ............ 707/1 |
| 2007/0088681 A1 | 4/2007 | Aravamudan et al. |
| 2007/0094257 A1 | 4/2007 | Lankford |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0049757 A1 * | 2/2010 | Thomas et al. ............ 707/613 |
| 2010/0191726 A1 * | 7/2010 | Havelivala ............ 707/728 |

(56) References Cited

U.S. PATENT DOCUMENTS

| | | |
|---|---|---|
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

OTHER PUBLICATIONS

Non-Final Office Action from U.S. Appl. No. 13/292,025, dated Nov. 23, 2012.

Non-Final Office Action from U.S. Appl. No. 13/292,011, dated Nov. 23, 2012.

Final Office Action from U.S. Appl. No. 13/292,025, dated Jun. 12, 2013.

Final Office Action from U.S. Appl. No. 13/292,011, dated Jun. 12, 2013.

Non-Final Office Action from U.S. Appl. No. 13/874,416, dated Apr. 10, 2014.

Non-Final Office Action from U.S. Appl. No. 13/874,407, dated Apr. 14, 2014.

Final Office Action from U.S. Appl. No. 13/874,407, dated Sep. 26, 2014.

Final Office Action from U.S. Appl. No. 13/874,416, dated Sep. 29, 2014.

Non-Final Office Action from U.S. Appl. No. 13/874,407, dated Feb. 3, 2015.

Non-Final Office Action from U.S. Appl. No. 13/874,416, dated Jan. 7, 2015.

Final Office Action from U.S. Appl. No. 13/874,407, dated Jul. 8, 2015.

Final Office Action from U.S. Appl. No. 13/874,416, dated Aug. 7, 2015.

* cited by examiner

MRU table definition core.mru

| Name | Null? | Type |
|---|---|---|
| ORGANIZATION_ID | NOT NULL | CHAR(15) |
| USERS_ID | NOT NULL | CHAR(15) |
| KEY_PREFIX | NOT NULL | CHAR(3) |
| ENTRY_DATE | NOT NULL | DATE |
| ENTITY_ID | NOT NULL | CHAR(15) |

FIG. 4

FIG. 5a: Search Name lookup schema

```
CREATE TABLE    core.new_search_name_lookup (
    organization_id NOT NULL,
    key_prefix NOT NULL,
    division NOT NULL,
    name_type NOT NULL,
    name NOT NULL,
    entity_id NOT NULL
```

FIG. 5b: Sample query for fallback search

Select entity_id from new_search_name_lookup where name like "california"

FIG. 6 Query Processing Flow
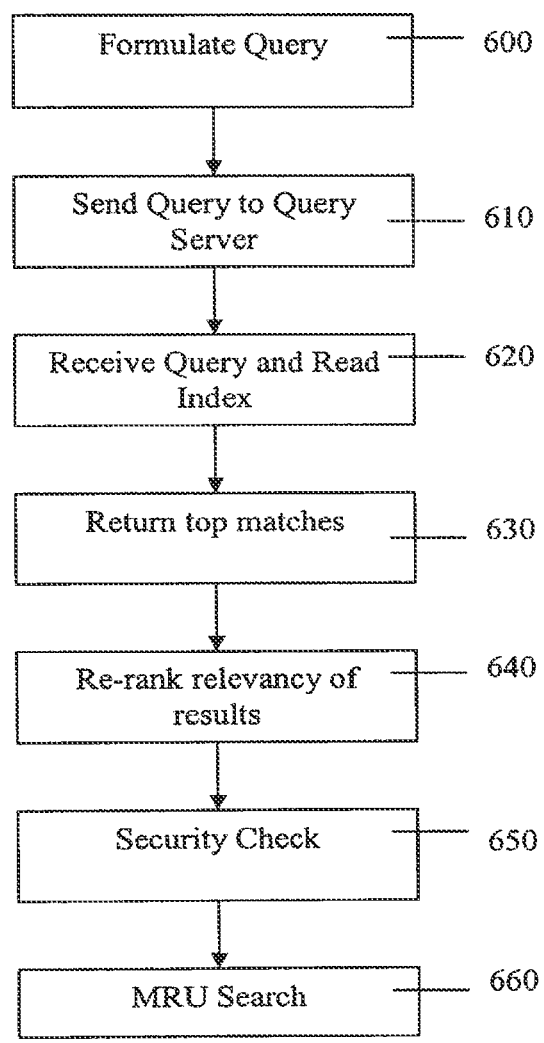

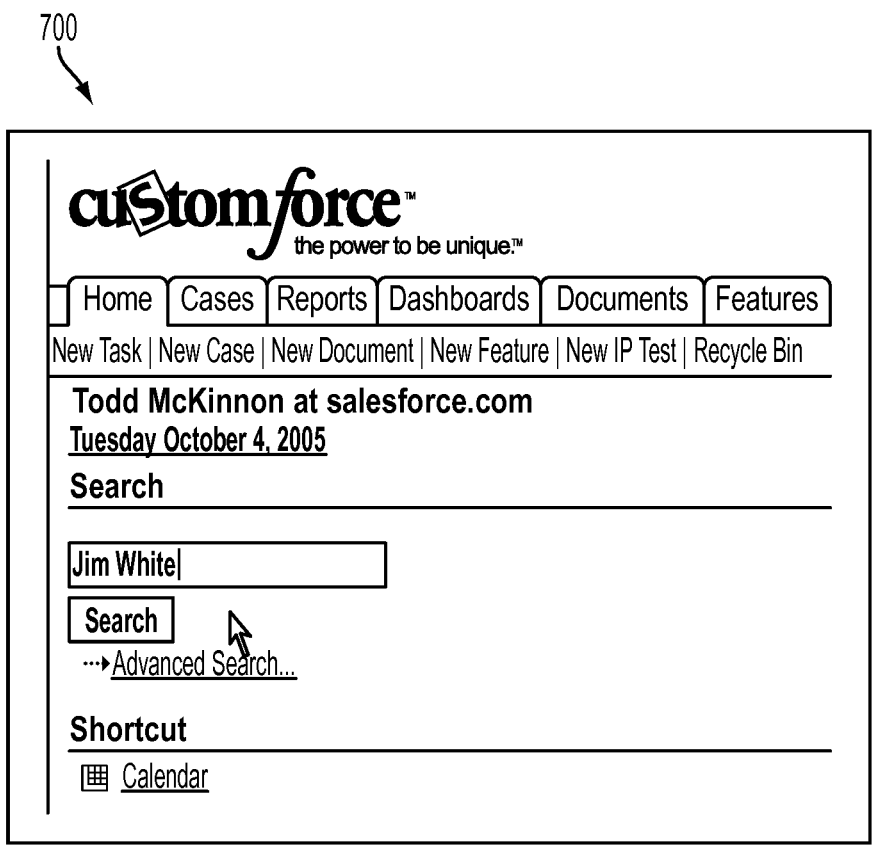
FIG. 7:Sidebar Search UI

FIG. 8: Advanced Search UI

FIG. 9: Search Results UI

| Account Standard Fields | |
|---|---|
| Field Label | Data Type |
| Account Currency | Picklist |
| Account Name | Text(80) |
| Account Name (Local) | Text(80) |
| Account Number | Text(40) |
| Account Owner | Lookup |
| Account Record Type | Record Type |
| Account Site | Text(80) |
| Annual Revenue | Currency(18, 0) |
| Billing Address | Address |
| Created By | Lookup |
| Description | Long Text Area(32000) |
| Employees | Number(8, 0) |
| Fax | Fax |
| Industry | Picklist |
| Last Modified By | Lookup |
| License Count | Number(9, 0) |
| Organization ID | Text(15) |
| Organization Status | Text(80) |
| Ownership | Picklist |
| Parent Account | Lookup |
| Phone | Phone |
| Rating | Picklist |
| Shipping Address | Address |
| SIC Code | Text(20) |
| Ticker Symbol | Content(20) |
| Type | Picklist |
| Website | URL(255) |

| Account Fields | |
|---|---|
| Fields Searched in Both Sidebar Search & Advanced Search | Fields Searched in Advanced Search Only |
| Account Name | Billing Address |
| Account Name (Local) | Description |
| Account Number | Shipping Address |
| Account Site | All custom fields of type text, text area, long text area, email, and phone |
| Fax | |
| Phone | |
| Ticker Symbol | |
| Website | |
| All custom fields of type auto-number. Note that you do not need to enter any leading zeros during a search. | |

FIG. 10: Example of DB Fields vs. Indexed Fields

METHODS AND SYSTEMS FOR OPTIMIZING TEXT SEARCHES OVER STRUCTURED DATA IN A MULTI-TENANT ENVIRONMENT

CROSS-REFERENCE TO RELATED APPLICATIONS

This application is a continuation of U.S. application Ser. No. 13/292,025, filed Nov. 8, 2011, and a continuation of U.S. application Ser. No. 13/292,011, filed Nov. 8, 2011, which are continuations of U.S. application Ser. No. 11/293,857, filed Dec. 2, 2005, the entire contents of which are incorporated herein by reference.

BACKGROUND THE INVENTION

The present invention relates generally to systems and methods for searching data, and more particularly to systems and methods for enhancing search results and text searches over structured data in a web application.

Due to the popularity and accuracy of current web search technology, users have come to expect quick up-to-date presentation of search results with the most relevant results presented at or near the top of the search results page. Web applications inevitably come with a similar set of expectations. Although in many regards a comparison is faulty, for example a Web application's data set looks very different compared to most web pages, with the exception of attachments, documents, and notes. Regardless of differences, customers almost certainly don't realize or care about this, and expect the same functionality out of a web application-based search. Despite all of the differences, there is much in common from an input box available on ever page to how it is used primarily in order to find a specific record. This is in fact a common usage pattern of web search known as a navigational search and it is something web search engines are quite good at. One of the reasons they excel in this area is because they use other information besides the text on the web page itself in order to do the scoring (link text is one good example of this).

The ordering of search results in web applications may not always rank the most relevant results at or near the top of the results page. Search results are typically ranked based solely on a "relevancy" score given by the search engine. One example of a useful search engine for use in web applications is Lucene from The Apache Software Foundation. Lucene is a text search engine library written in Java, and is suitable for nearly any application that requires full-text search. With Lucene, for example, the score is calculated using a standard information retrieval algorithm based on many factors. While this score may be quite useful in the overall rankings, the search engine doesn't take many factors outside the scope of the index into consideration.

Although the score provided by the search engine is quite useful, it does have limitations. Because a search is the most common means of end-user navigation to a specific record in a multi-tenant database system, such as that provided by salesforce.com, it is desirable to provide more relevant results in response to a search request, and thereby increase end-user productivity and satisfaction with the search functionality. This would also reduce the load on the system if users can find the record they want without having to go to the detail pages of multiple results.

Also, in systems where searching of structured data is implemented, such as in a multi-tenant database system, search indexing latency can often be a problem, especially re a user who recently added or modified data immediately searches for items using a term that should return a recently modified data entry. In the salesforce.com system, for example, search queries are run against a search index that is a replica of an organization's data. As organization data is added or changed, a background process (a search indexer) asynchronously updates the search index. Under peak system load, the volume of data change in the system may be so high that the search index update process can run behind, e.g., 2 to 5 minutes or more behind. As a result, there may be a lag time, e.g., 2 to 5 minutes or more, between the time data is entered or changed in the system and the time it may appear in search results. This is especially inconvenient for users when they make a change to the data (e.g., modify, add, delete) then immediately search for the data and are unable to find it because of search indexing latency.

Therefore it is desirable to provide search systems and methods that overcome the above and other problems. For example, it is desirable to provide search systems and methods that eliminate or reduce search indexing latency. It is also desirable to provide search systems and methods that enhance the relevancy of results returned.

BRIEF SUMMARY OF THE INVENTION

The present invention provides search systems and methods for searching structured data and enhancing the relevancy of search results provided to a requesting user or application.

According to the present invention, enhanced search results are provided by searching a cache of a user's most recently used items to eliminate or reduce search indexing latency. Also, more relevant search results are provided by re-ranking results based on use history, data security models and/or hierarchical user role models. Further, enhanced search results are provided by including user information in the search index.

According to one aspect of the present invention, a method is provided for performing a text search over structured data in a database system. The method typically includes formulating a search query including a first search parameter, sending the search query to a query server, searching indexed data records in the database system using the first search parameter, and returning a plurality of matching records and associated relevancy scores. The method also typically includes modifying the relevancy scores based on activity data associated with the matching records, and ordering the matching records in an order based on the modified relevancy scores.

According to another aspect of the present invention, a method is provided for reducing or eliminating the effects of indexing latency when performing a text search over structured data in a database system, wherein an indexing process asynchronously indexes the database as users add or modify records in the database. The method typically includes receiving a search request including a search parameter from a first user system, and performing a first search over indexed data records in the database system using the search parameter. The method also typically includes performing a second search, using the search parameter, on a data structure containing a copy of the most recent database records that have been modified by the first user system or modified in response to a request from the first user system to add or modify data, and providing the results of the first search and the second search to the first user system. In certain aspects, the first and second searches may be performed sequentially or simultaneously.

According to yet another aspect of the present invention, a method is provided for performing a backup search in a database system when a search index query over structured data in a database system times-out. The method typically includes formulating a search query by an application server, the search query including a first search parameter, and sending the search query to a query server to search over indexed data records in the database system. If no response to the search query is received within a specified timeout period, the method typically includes automatically performing a database lookup using the search parameter in a search name table that stores name information for data objects in the database system.

According to yet another aspect of the present invention, a method is provided for performing a text search over structured data in a database system. The method typically includes receiving a search request including a search parameter from a first user system, formulating a search query including the first search parameter and user information, and sending the search query to a query server. The method also typically includes searching indexed data records in the database system using the first search parameter and the user information, wherein the indexed data records include at least one user information field, and returning records matching on the search parameter, and a relevancy score for each returned record, wherein relevancy scores of records matching on the search parameter and matching on the user information field are higher than the relevancy scores for matching records not matching on the user information field. In certain aspects, the at least one user information field includes a user ID field and/or a user role field, and the user information in the search query includes one or both of a user ID and a role of the user from which the search request originated.

According to a further aspect of the present invention, a multi-tenant database system is provided which implements one or more of the methods of performing a text search over structured data, reducing or eliminating the effects of indexing latency, and performing a backup search as discussed and described herein.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 4 shows an example of a table definition of an MRU according to one embodiment.

FIG. 5*a* illustrates a search name lookup schema, and FIG. 5*b* illustrates an example of a fallback search query, according to one embodiment.

FIG. 6 illustrates an example of a query processing flow according to one embodiment.

FIG. 7 illustrates an example of a user interface display of a sidebar search page according to the present invention.

FIG. 8 illustrates an example of a user interface display of a page for conducting an advanced search according to the present invention.

FIG. 9 illustrates an example of a user interface display of a search results page according to the present invention.

FIG. 10 illustrates an example of database (DB) fields and indexed fields for a standard entity according to the present invention.

DETAILED DESCRIPTION OF THE INVENTION

The present invention provides systems and methods for searching structured data and enhancing the relevancy of search results provided to a requesting user or application. In particular, the present invention provides systems and methods for searching structured data stored in a multi-tenant database system and for providing enhanced search results by removing search indexing latency. Also, the present invention, in certain aspects, provides systems and methods for presenting more relevant search results by re-ranking results based on use history, data security models and/or hierarchical user role models. In certain aspects, the present invention provides enhanced search results by including user information in the search index.

Figure 1:
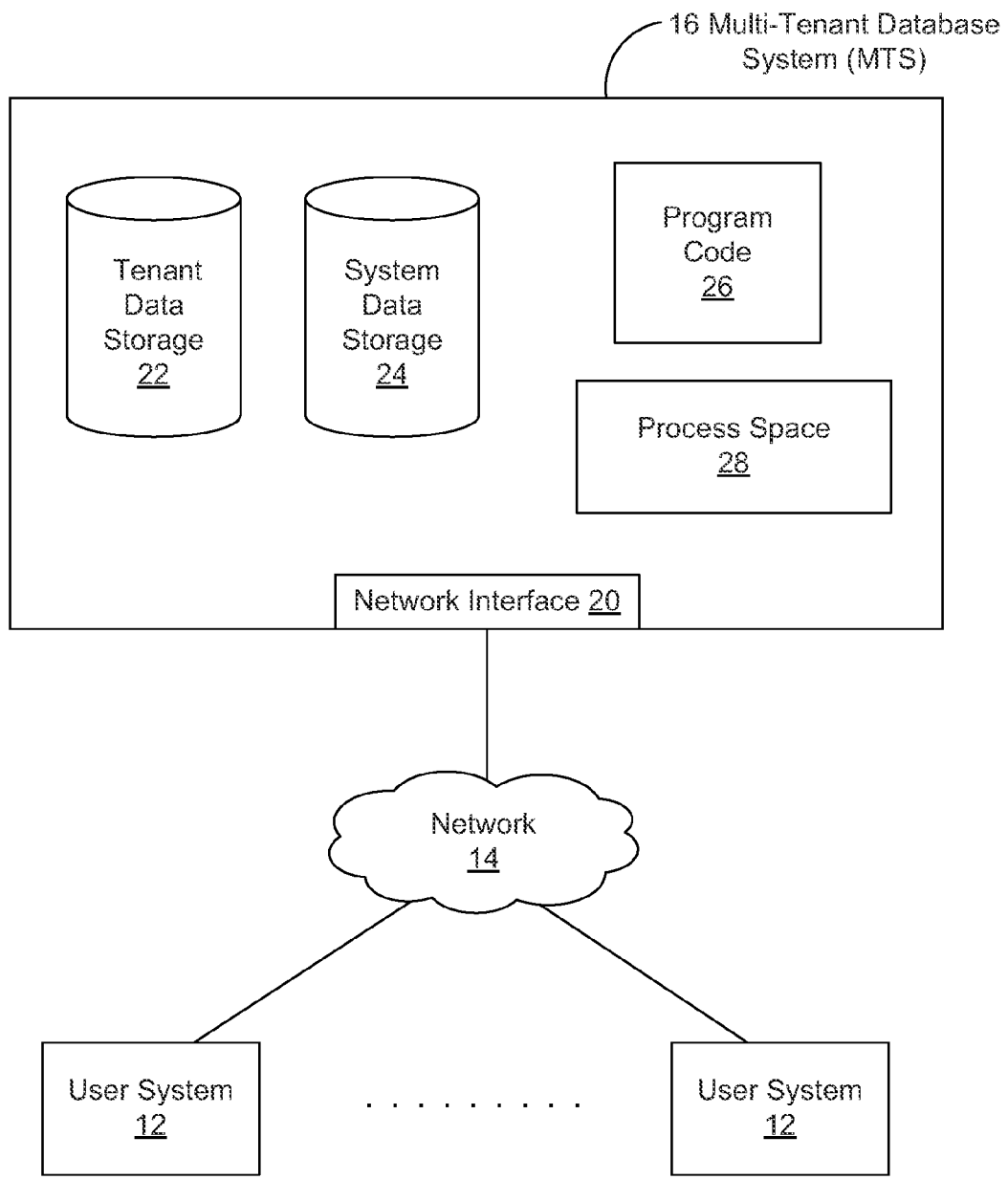
FIG. 1 illustrates an environment wherein a multi-tenant database system might be used.

FIG. 1 illustrates an environment wherein a multi-tenant database system might be used. As illustrated in FIG. 1 (and in more detail in FIG. 2) any user systems 12 might interact via a network 14 with a multi-tenant database system (MTS) 16. The users of those user systems 12 might be users in differing capacities and the capacity of a particular user system 12 might be entirely determined by permissions (permission levels) for the current user. For example, where a salesperson is using a particular user system 12 to interact with MTS 16, that user system has the capacities allotted to that salesperson. However, while an administrator is using that user system to interact with MTS 16, that user system has the capacities allotted to that administrator. In systems with an hierarchical role model, users at one permission level may have access to applications, data and database information accessible by a lower permission level user, but may not have access to certain applications, database information and data accessible by a user at a higher permission level. Thus, different users will have different capabilities with regard to accessing and modifying application and database information, depending on a user's security or permission level.

Network 14 can be a LAN (local area network), WAN (wide area network), wireless network, point-to-point network, star network, token ring network, hub network, or other configuration. As the most common type of network in current use is a TCP/IP (Transfer Control Protocol and Internet Protocol) network such as the global internetwork of networks often referred to as the "Internet" with a capital "I," that will be used in many of the examples herein. However, it should be understood that the networks that the present invention might use are not so limited, although TCP/IP is the currently preferred protocol.

User systems 12 might communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a "browser" for sending and receiving HTTP messages to and from an HTTP server at MTS 16. Such HTTP server might be implemented as the sole network interface between MTS 16 and network 14, but other techniques might be used as well or instead. In some implementations, the interface between MTS 16 and network 14 includes load sharing functionality, such as round-robin HTTP request distributors to balance loads and distribute incoming HTTP requests evenly over a plurality of servers. Preferably, each of the plurality of servers has access to the MTS's data, at least as for the users that are accessing that server.

In one aspect, the system shown in FIG. 1 implements a web-based customer relationship management (CRM) system. For example, in one aspect, MTS 16 can include application servers configured to implement and execute CRM software applications as well as provide related data, code, forms, web pages and other information to and from user systems 12 and to store to, and retrieve from, a database system related data, objects and web page content. With a multi-tenant system, tenant data is preferably arranged so that data of one tenant is kept logically separate from that of other tenants so that one tenant does not have access to another's data, unless such data is expressly shared. In preferred aspects, system 16 implements applications other than, or in addition to, a CRM application. For example, system 16 may provide tenant access to multiple hosted (standard and custom) applications, including a CRM application.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application hosting service. Additional processes that may execute on MTS 16 include database indexing processes.

Several elements in the system shown in FIG. 1 include conventional, well-known elements that need not be explained in detail here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from MTS 16 over network 14. Each user system 12 also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms, applications and other information provided by MTS 16 or other systems or servers. For example, the user interface device can be used to access data and applications hosted by MTS 16, and to perform searches on stored data, and otherwise allow a user to interact with various GUI pages that may be presented to a user.

As discussed above, the present invention is suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium processor or the like. Similarly, MTS 16 (and additional instances of MTS's, where more than one is present) and all of their components might be operator configurable using application(s) including computer code run using a central processing unit such as an Intel Pentium processor or the like, or multiple processor units. A computer program product including computer code for operating and configuring MTS 16 to intercommunicate and to process web pages, applications and other data and media content as described herein is preferably downloaded and stored on a hard disk, but the entire program code, or portions thereof, may also be stored in any other volatile or non-volatile computer readable (e.g. memory) medium or device as is well known, such as a ROM or RAM, or provided on any media capable of storing program code, such as a compact disk (CD) medium, digital versatile disk (DVD) medium, a floppy disk, and the like, Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, any other markup language, Java, JavaScript, any other scripting language such as VBScript, and many other programming languages as are well known.

According to one embodiment, each MTS 16 is configured to provide web pages, forms, applications, data and media content to user systems 12 to support the access by user systems 12 as tenants of MTS 16. As such, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 2:
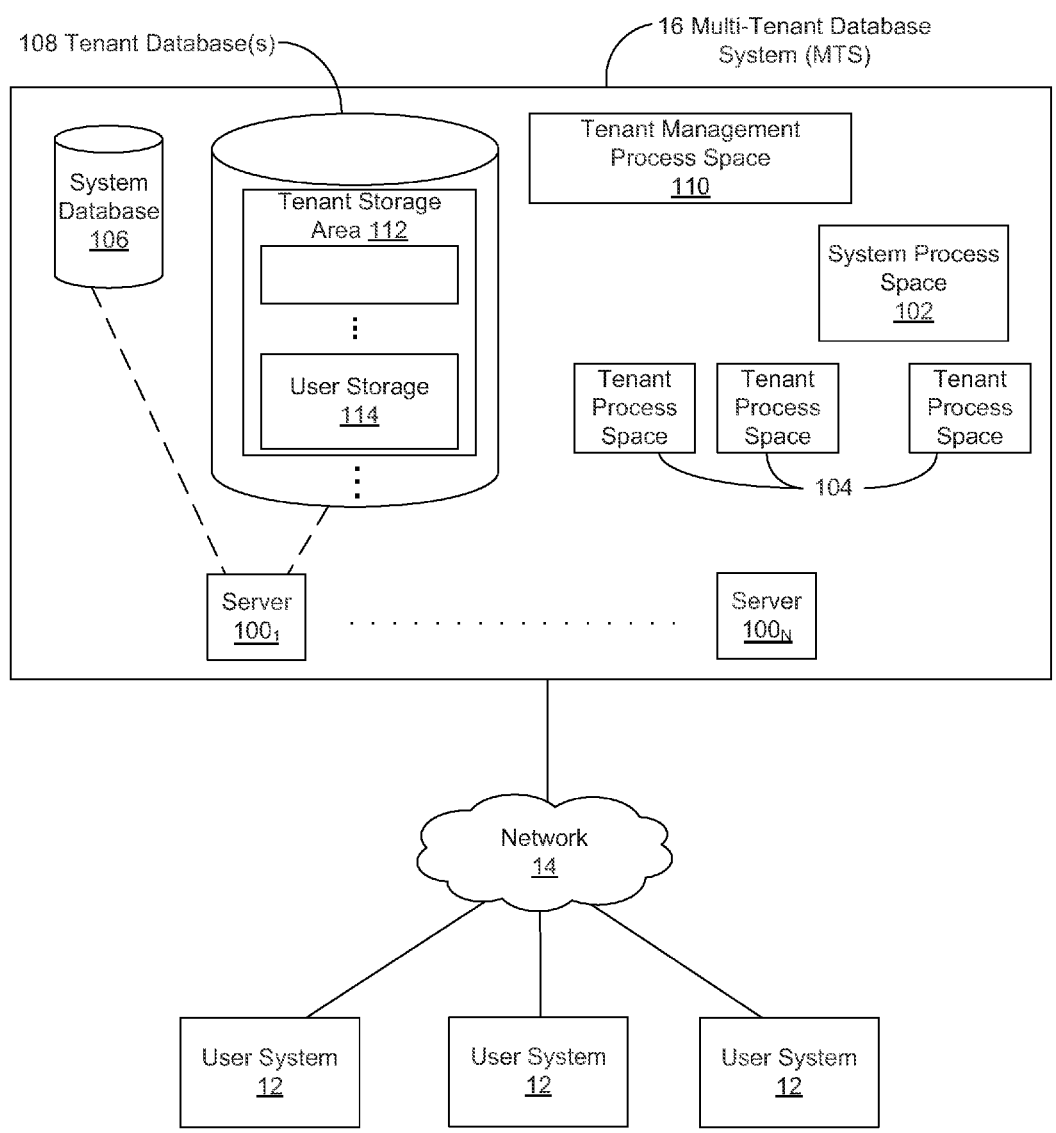
FIG. 2 illustrates elements of FIG. 1 and various interconnections in more detail.

FIG. 2 illustrates elements of MTS 16 and various interconnections in more detail. In this example, the network interface is implemented as one or more HTTP application servers 100. Also shown is system process space 102 including individual tenant process spaces 104, a system database 106, tenant database(s) 108 and a tenant management process space 110. Tenant database 108 might be divided into individual tenant storage areas 112, which can be either a physical arrangement or a logical arrangement. Within each tenant storage area 112, user storage 114 might similarly be allocated for each user. For example, a copy of a user's most recently used (MRU) items, as will be discussed below in more detail, might be stored to user storage area 114. Similarly, a copy of MRU items for an entire organization that is a tenant might be stored to tenant storage area 112.

It should also be understood that each application server 100 may be communicably coupled to database systems, e.g., system database 106 and tenant database(s) 108, via a different network connection. For example, one server $100_1$ might be coupled via the Internet 14, another server $100_{N-1}$ might be coupled via a direct network link, and another server $100_N$ might be coupled by yet a different network connection. Transfer Control Protocol and Internet Protocol (TCP/IP) are preferred protocols for communicating between servers 100 and the database system, however, it will be apparent to one skilled in the art that other transport protocols may be used to optimize the system depending on the network interconnect used.

In preferred aspects, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system (not shown) implementing a load balancing function e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as round robin and observed response time, also can be used. For example, in certain aspects, three consecutive requests from the same user could hit three different servers, and three requests from different users could hit the same server. In this manner, MTS 16 is multi-tenant, wherein MTS 16 handles storage of, and access to, different objects, data and applications across disparate users and organizations.

As an example of storage, one tenant might be a company that employs a sales force where each salesperson uses MTS 16 to manage their sales process. Thus, a user might maintain contact data, leads data, customer follow-up data, performance data, goals and progress data, etc., all applicable to that user's personal sales process (e.g., in tenant database 108). In the preferred MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by MTS 16 that are allocated at the tenant level while other data structures might be managed at the user level. Because an MTS might support multiple tenants including possible competitors, the MTS should have security protocols that keep data, applications and application use separate. Also, because many tenants will opt for access to an MTS rather than maintain their own system, redundancy, up-time and backup are additional critical functions and need to be implemented in the MTS.

In addition to user-specific data and tenant-specific data, MTS 16 might also maintain system level data usable by multiple tenants or other data. Such system level data might include industry reports, news, postings, and the like that are sharable among tenants.

In certain aspects, client systems 12 communicate with application servers 100 to request and update system-level and tenant-level data from MTS 16 that may require one or more queries to database system 106 and/or database system 108. MTS 16 (e.g., an application server 100 in MTS 16) generates automatically one or more SQL statements (the SQL query) designed to access the desired information.

Each database can generally be viewed as a collection of objects, such as a set of logical tables, containing data fitted into predefined categories. A "table" is one representation of a data object, and is used herein to simplify the conceptual description of objects and custom objects according to the present invention. It should be understood that "table", "entity" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead and Opportunity data, each containing pre-defined fields.

In some multi-tenant database systems, such as the salesforce.com system, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, titled "Custom Entities and Fields In a Multi-Tenant Database System", and which is hereby incorporated by reference, teaches systems and methods for creating custom objects as well as customizing standard objects in a multi-tenant database system.

Searching

Figure 3:
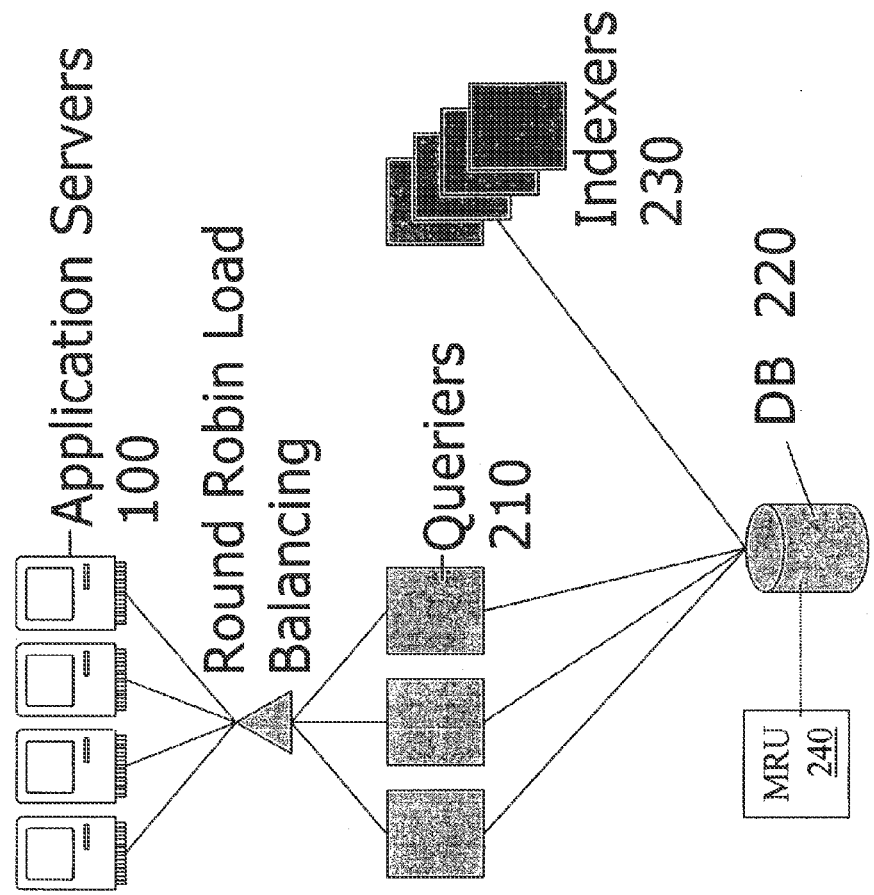
FIG. 3 illustrates the architecture of a search system 200 according to one embodiment.

FIG. 3 illustrates the architecture of a search system 200 according to one embodiment. In one aspect, the search system of FIG. 3 is implemented in the multi-tenant database system 16 of FIG. 1. As shown, search system 200 includes one or a plurality of query servers 210 ("queriers") communicably coupled to application server(s) 100 and a database system 220 (e.g., system database 106 and/or tenant database 108 of FIG. 2). Queriers 210 are also communicably coupled with indexers 230. Indexers 230 are indexing processes that query and index the database 220. It should be appreciated that an indexer 230 can be implemented in a separate server or computer system or it may be implemented or may execute in a query server 210 or in an application server 100, and multiple indexers may execute in different systems. Similarly, a querier 210 may be implemented or may execute in a separate server or computer system or it may be implemented or may execute in an application server 100.

In typical operation, an application server 100 sends a query request to a querier 210. Where multiple queriers 210 are present, a load balancing (e.g., round robin) process may be implemented to direct the query to a specific querier 210. Typically, the query request is in the form of an HTTP request including a search parameter (e.g., term or terms to be searched), although other forms and protocols may be used. The querier 210 that receives the query performs a search by reading the search index(es) created by the indexers 230 to determine one or more matches with the term(s) provided. The results are returned to the requesting application server 100. The results are typically returned with a base "relevancy" score as determined by the underlying search engine process, e.g., Lucene. Typically, a pre-designated upper limit of N (e.g., 1000, 2000, 5000, etc.) search index results is provided to the querier 210 by the search engine in order of relevancy. As will be described in more detail below, the relevancy of search results may be enhanced according to various embodiments and aspects of the present invention.

As data is added or changed in the database, a search indexer 230 (a background process) asynchronously updates the search index. In one aspect, a search index is stored to the database 220, but it may be stored to a separate storage system. In a multi-tenant database environment, in one aspect, a separate index is created for each organization. Each organization may have one or more separate indexers 230 executing on its behalf, or one or more indexers 230 may be shared between organizations. In one aspect, for example, one indexer executes per instance per indexing host.

Upon a database insert or update event, a timestamp is assigned to the added or modified data. For example, in one aspect, modified or added data is copied to a "to be indexed" table including fields for data type and timestamp. This timestamp indicates the date (and time) from which all data in the table needs to be indexed. As the indexer executes, to determine the set of data that needs to be indexed, the indexer queries a table's data looking for rows which have a system_modstamp>=the timestamp in the to be indexed table, where system_modstamp is a field that includes the time that the system last modified or changed the data row. The returned rows represent the data that needs indexing. In one aspect, chunks of row IDs are read from the "to be indexed" table. For each ID, the indexer queries the database for the source row of data and copies all the relevant fields (e.g., fields of a type that may be indexed, such as text, phone number, e-mail address, etc.) to an index file in the appropriate index format. In one aspect, user information such as the record owner field and/or role hierarchy information field(s) are also indexed to provide more relevantly ordered results in response to a query including the user ID and/or user role as search parameters as will be discussed below.

As an index for an organization grows, it may be partitioned. For example, a large organization may have several physical partitions in the search index. Additionally, depending on the load on the system, there may be a latency between when data is added or modified in the database and when it appears in an index. To hide the impact of this lag time from the user, in one aspect, the user's most recently used records and objects are tracked or cached for inclusion in the search results as will be discussed in more detail below.

Most Recently Used Cache

Search queries run against a search index that is built from an organization's data. As above, as organization data is added or changed, a background process (the search indexer) asynchronously updates the search index. Under peak system load, the volume of data change in the system is such that the search index update process can run behind, e.g., lag up to 5 minutes or more. This means there can be a lag in time between the time data is entered or changed in the system and the time it appears in search results. This is especially inconvenient for users when they make a change then immediately search for it and are unable to find it because of search indexing latency.

To optimize the search results, in one embodiment, the system maintains a per-user cache of recent objects the user has added or changed. For example, the cache may hold the last N (e.g., any number ranging up to 50 or 100 or more) objects the user has added or modified, or it may hold all objects a user has added or modified within a specified time period, e.g., within the last 2 to 5 or more minutes. With reference to FIG. 3, this cache will be referred to as the Most Recently Used list or MRU 240. In certain aspects, the MRU 240 is stored in the database 220 keyed by organization id and user id. Alternatively, the MRU 240 may be stored separately from the database 220. FIG. 4 shows an example of a table definition of an MRU according to one embodiment. In one aspect, when a search query is received, the system checks the search index for relevant "matching" results. The system also searches the MRU for matching objects and returns MRU search results. For example, an application server 100 may itself search or scan the MRU to include relevant MRU items in the search results after it has received index-matching results from a querier 210, or a querier 210 may search or scan the MRU and incorporate relevant MRU items in the search results before providing the results to the application server 100. The index search results and MRU search results are returned to, and displayed at, a requesting user system 12. In one aspect, the index search results and the MRU search results are distinguished or displayed separately.

In another aspect, the results of the MRU search are mixed in with the other search results, so users won't know explicitly that some results came from the search index and some from the MRU. This is useful in cases where, for example, only one term (e.g., the first tem) of multiple search terms is used as the search parameter. For example, the MRU results may be wrong for the search because if it only uses the first term: e.g., if they search for "scott h", the MRU search just looks for "scott" and so would find scott yancey. This may confuse the user so it is desirable to limit the MRU searching to just the unindexed time. In one aspect, only one term, such as the first term, is used in the search of the MRU because this simple query can be implemented using a database lookup instead of a true search index.

Thus, the present invention, advantageously allows a user who adds or edits data and then searches for it to see the recently added or changed data in their search results even if the search indexing process is behind or lagging.

According to another aspect, rather than searching the user's MRU for unindexed data, the system searches all or a subset of the MRU for an entire organization with which the user is associated, e.g., search all the unindexed data for the entire organization. However, searching the MRU for the entire organization may be less desirable than searching only the user's MRU, or a smaller subset of an organization's MRU, in certain instances. For example, the set of unindexed data for an entire organization could be very large, significantly slowing down the users search. Additionally, the search over unindexed data may use a different, simpler algorithm that results in different results than the normal search process. It is desirable to minimize the amount of unindexed data that could potentially show up in the search results. The user's MRU data typically proves to be the best set of highly relevant data; it is more likely that the user is searching for something they recently modified compared to all recent modifications for the entire organization with which the user is associated.

Search Result Relevancy Based on Security and Rule Hierarchy Models

In certain aspects, search queries are run against an organization's search index which contains text from all the organization's records in the database. For common search terms such as "Jim" or "Main Street", the index may return thousands of matching records, many of which may not be visible to the user based on sharing and security settings. For example, the user may not have access to many of the records or rows returned based on a security model, e.g., hierarchical permission levels. Also, most of these thousands of results are likely not relevant, or at least less relevant, to the user.

According to one embodiment, a security check is performed wherein the search results are filtered based on sharing rules after the results are returned from the search engine. In one aspect, application server 100 queries the database for sharing rules, and filters the search results based on the sharing rules. In another aspect, a querier 210 queries the database for sharing rules and filters the search results before providing the search results to the requesting application server 100. To limit the database performance impact of querying for sharing rules, an upper limit of N (e.g., 1000, 2000, 5000, etc.) search index results is established for which the system will attempt to apply the security check. If the search results from the index contain more than N entries, it is very important that they are ordered by relevance to the user so that the results the user is most likely interested in are included in the N entries that continue to the security check and eventually are presented to the user.

According to one embodiment, the search results are optimized by adding the record owner field to the index as a separate search index field. In this aspect, the application server 100 can also include the user's IDs as a search parameter so that matches on the owner field are boosted in the search results relevancy scores. Since the user always has security access to anything they own, this would dramatically increase the likelihood that a query server would return hits that the user has access to in the first N results.

Furthermore, in another embodiment, search results are optimized using a user role Hierarchy model. In systems implementing a role hierarchy, such as in the salesforce.com system, users may have access to records owned by their subordinates in the role hierarchy. In this embodiment, the role of the record owner is added to the search index as a separate search index field. At query time, the search query is expanded to include a boost on all records owned by the user's subordinates in the role security hierarchy to further enhance likelihood of obtaining relevant matches. For example, where a user at level 1 performs a search, records owned by that user that match the search term(s) are boosted in the relevancy score above those matching records not owned by that user. Further, records owned by a subordinate user at level 2 that match the search term(s) are also boosted above those matching records not owned by those users. It should be appreciated that this aspect is not limited to a role hierarchy; it applies to any other user hierarchies that may be implemented in the system, such as a sales territory hierarchy or any other security hierarchy. Further, it should be appreciated that a user may specifically identify a user role as a specific search parameter, assuming of course that the identified role is not a superior role to the user's role in the hierarchy.

Re-Ranking Search Results Based on Entity History

According to one embodiment, entity (i.e., standard or custom database object or table) history is used to modify a search result's relevancy score. For example, entity history may indicate that a data row is more active than others within the search result set and that it should therefore be moved to a higher position in the search results set. Data rows that have more activity associated with them (e.g., creating follow-up tasks for an account or logging a phone call with a contact) will likely be more active in the system and more relevant to the user performing the search. Similarly, data that has been recently updated, even by another user, may be more relevant to the user performing the search.

In a first step of the re-ranking process, according to one embodiment, the search relevancy scores returned by the search engine, e.g., Lucene, are normalized. For example, the raw Lucene score can be any decimal number from 0 to M, e.g., 10 or more. The normalization function converts the raw score into a smaller (arbitrary) integer value, e.g., 0 through 4. Next, a score is assigned to the data row based on an activity measure. In one aspect, for example, a score is assigned to the data row based on the values of last update and last activity fields. Last update is the last time a use modifies a given record (e.g., updating an address on an account). Last activity is the last time a user performed any action associated with the data row (e.g., creating a follow up task, or logging a call). Thereafter, the normalized search score, the last update score and the last activity score are multiplied by a weight factor to arrive at a final relevancy score. The weight factor can be an integer or a fraction of an integer. Search results are then ordered with highest relevancy scores first and ultimately presented to the user. It should be understood that an application server 100, a querier 210 or other system entity may implement the re-ranking process.

Table 1, below, shows an example of re-ranking scores and weights according to one aspect, although the exact values can be altered to tune the relevancy. In the Tablet 1 example, last activity is given more weight than last update, because typically most activity on an entity takes place in its child records.

TABLE 1

| Entity | | |
|---|---|---|
| Formula and values | Score | Weight |
| Search Score normalized | 0-4 | 3 |
| Last Update | | 1 |
| <1 hour old | 4 | |
| <1 day old | 3 | |
| <7 days old | 2 | |
| <30 days old | 1 | |
| Older than 30 days | 0 | |
| Last Activity | | 2 |
| <1 hour old | 4 | |
| <1 day old | 3 | |
| <7 days old | 2 | |
| <30 days old | 1 | |
| Older than 30 days | 0 | |
| Not set | 2 | |
| Tie Breaker | | N/A |
| Account name (lower case) | | |

In Table 1, the entity can be any entity provided in the system such as standard entities or custom entities. In the salesforce.com system, for example, this could include such standard entities include Accounts, Leads and Contacts as well as custom entities.

Table 2 shows an example of search engine results and the order in which they currently might be displayed (raw score is the Lucene score):

TABLE 2

| Account Name | Raw Score | Normalized Score | Last Update | Last Activity | Re-ranked score |
|---|---|---|---|---|---|
| Acme | 1.30 | 4 | 2 years ago | 2 years ago | 12 + 0 + 0 = 12 |
| Acme East Co. | 1.14 | 4 | 9 days ago | 2 weeks ago | 12 + 2 + 2 = 16 |
| Acme Brand Inc | 1.11 | 4 | 30 minutes ago | 10 minutes ago | 12 + 4 + 8 = 24 |
| Acmesoft | 0.72 | 3 | 8 days ago | 2 days ago | 9 + 1 + 4 = 14 |

In this example, after the re-ranking process described above with reference to the example of Table 1, the 3rd result would jump to the top of the list with a re-ranked score of 24. Although this is a contrived example, one can see how the raw scores that are somewhat lumped close together may not be in a desired ordering, as a user is more likely to be interested in the Acme Brand Inc. account, which has had some recent activity, than the Acme account which has been dormant for two years. In fact, in this case, the Acme account which previously would have been ranked at the top without re-ranking has fallen to the bottom of the list. Although the data set for this example is contrived, it shows the power of the re-ranking process of the present invention.

It should understood that any entity fields in addition to those fields that are representative of an activity measure may be used in the calculation of a final score and that various weightings may be provided to different fields as desired. As examples, an Opportunity entity in the salesforce.com system might be scored with weights for fields such as closed, close date and last activity as shown in the example below.

| Opportunity | | |
|---|---|---|
| Formula and values | Score | Weight |
| Search Score normalized | 0-4 | 6 |
| Closed | | 4 |
| open | 1 | |
| closed | 0 | |
| Close Date | | 1 |
| Over 7 days in the past | 1 | |
| Within 7 days of today (past or future) | 4 | |
| In the next 30 days | 3 | |
| In the next 90 days | 2 | |
| Over 90 days, or not set | 0 | |
| Last Activity | | 1 |
| <1 hour old | 4 | |
| <1 day old | 3 | |
| <7 days old | 2 | |
| <30 days old | 1 | |
| Older than 30 days | 0 | |
| Not set | 2 | |
| Tie Breaker | | N/A |
| Name (lower case) | | |

Similarly, a Cases entity in the salesforce.com system might be scored with weights for fields such as escalated, closed, and last update as shown in the example below.

| Cases | | |
|---|---|---|
| Formula and values | Score | Weight |
| Search Score normalized | 0-4 | 4 |
| Escalated | | 4 |
| Is escalated | 1 | |
| Not escalated | 0 | |
| Closed | | 3 |
| open | 1 | |
| closed | 0 | |
| Last Update | | 1 |
| <1 hour old | 4 | |
| <1 day old | 3 | |
| <7 days old | 2 | |
| <30 days old | 1 | |
| Older than 30 days | 0 | |
| Not set | 2 | |
| Tie Breaker | | N/A |
| Case subject (lower case) | | |

Fallback Search Mode

According to one aspect, if the application server 100 does not receive a response from a query server within a specified timeout period, it performs a "fallback search". For example, the query server may not respond because it is overloaded with requests, or down for maintenance. In one aspect, a fallback search involves bypassing the search index and running a query against the database directly. FIG. 5a illustrates a "Search Name Lookup" schema, and FIG. 5b illustrates an example of a fallback search query, according to one embodiment. The fallback search queries the "Search Name Lookup" table, which is a denormalized table that stores name information for all entities in the system. This may not be as powerful as an index search as it only searches the name field, but often will give the user useful information.

In one aspect, the search results returned from the fallback search query are also filtered against security permissions and then returned to the user with a message explaining that the search results are not optimized using the index.

Search Query Processing Flow

FIG. 6 illustrates an example of a search query process flow according to one embodiment of the present invention. In step 600, the application server 100 formulates a query to be processed. The query formulated by application server 100 may be in response to a specific search request received from a user system 12, e.g., including specific search parameters such as a specific term or terms to be searched. Alternatively, the query formulated by application server 100 may be generated automatically based on some other user input or system status that may not be a specific search request. For example, a query may be formulated as part of an automatic solution suggestion application or in response to information input from a form posted by a user. The formulated query in certain aspects is in the form of a formatted HTTP message. In addition to a search parameter such as one or more terms to be searched, the query in one aspect includes information about the user (e.g., user ID and/or the user's role in a role hierarchy) so as to implicitly boost the relevancy of the results generated by the search engine.

In step 610, the formulated search query is sent to a query server 210. In step 620, the query server 210 receives the search query and performs a search using the received parameters, e.g., by reading the index across a storage area network. For multi-partition indexes, this is done in parallel in one aspect. The top N matching results, including a "relevancy" score, are returned to the query server 210, including results that the user may not have security access to or permission to view.

In step 630, the search results are returned to the requesting application server 100. In one aspect, the top N matches, including a rank and/or the "relevancy" score, are returned. Closer matches to the search term(s) will have a higher relevancy score.

In step 640, the search results are re-ranked based on activity, e.g., based on history or activity information such as last update and last activity of a data item. In one aspect, this step is performed by the application server 100 after the results have been received from querier 210. In another aspect, this step is performed by the query server 210 prior to returning results to the application server 100.

In step 650, the search results are filtered based on security permissions. In one aspect, all data that matches the search parameters are returned to the application server 100, including the data that the user may not have security access to or permission to view. In this aspect, application server 100 performs step 650. In another aspect, the query server performs step 650 and filters the N search results based on security permissions of the user, and sends the filtered results to the application server 100.

In step 660, the MRU 240 is processed to determine items that match the search parameters. In one aspect, application server 100 performs the MRU search 660. In another aspect, a query server 210 performs the MRU search 660. The results of the MRU search are combined with the index search results. In one aspect, MRU search 660 is performed substantially simultaneously with the search performed in step 620.

As will be appreciated, processing steps 640, 650 and 660 need not be performed in any specific order. Further, each of processing steps 640, 650 and 660 is optional; any combination of one or more of processing steps 640, 650 and 660 may be performed by an application server 100 and/or a query server 210 in any order.

In one embodiment, if the application server does not receive a response from the query server within a specified timeout period, the application performs a "fallback" search as described above. The timeout period may be exceeded due to the query server being overloaded or the system being down for maintenance. In one aspect, the fallback search simulates index searching functionality by performing a database query against a denormalized search name lookup table. This may not be as powerful as an index search, but will likely give the user useful information.

User Interface

In certain aspects, visual search tools are provided to a user to access and search structured data stored in database 220. For example, a graphical user interface including pages with search links may be displayed to a user on a display of user system 12.

FIG. 7 illustrates an example of a user interface display of a sidebar search page 700 according to the present invention. Page 700 includes an entry box for receiving as user input one or more terms to be searched. Upon entry of a term or terms and selection of the search button, the term(s) are sent to an application server 100, which then performs the appropriate search as discussed herein. Additionally, a link to an "advanced search" page (e.g., see FIG. 8) is presented on page 700. In addition to an advanced search page link, page 700 also includes sets of tabs (e.g., Home, Cases, Reports . . . ), where each tab represents a user interface into an element of an application or into a database object. Selection of a tab provides a user access to the object or element of the application represented by the tab. A tab set is a group of related tabs that work as a unit to provide application functionality. In this manner, selection of the displayed tabs and tab sets by a user allows for convenient switching between applications and/or database objects as desired. U.S. patent application Ser. No. 11/075,546, filed Mar. 8, 2005, titled "Systems and Methods for Implementing Multi-Application Tabs and Tab Sets," which is hereby incorporated by reference, discusses tabs and tab sets in more detail.

FIG. 8 illustrates an example of a user interface display of a page 800 for conducting an advanced search according to the present invention. As can be seen, in one aspect, the advanced search page 800 allows a user to enter a term or terms to be searched as well as to limit the search to specific object types and/or specific entities by selecting the specific objects and/or entities to be searched. Page 800 also allows a user to limit the search to only items that the user owns, such that only results that match on the user ID are returned.

Figure 9:
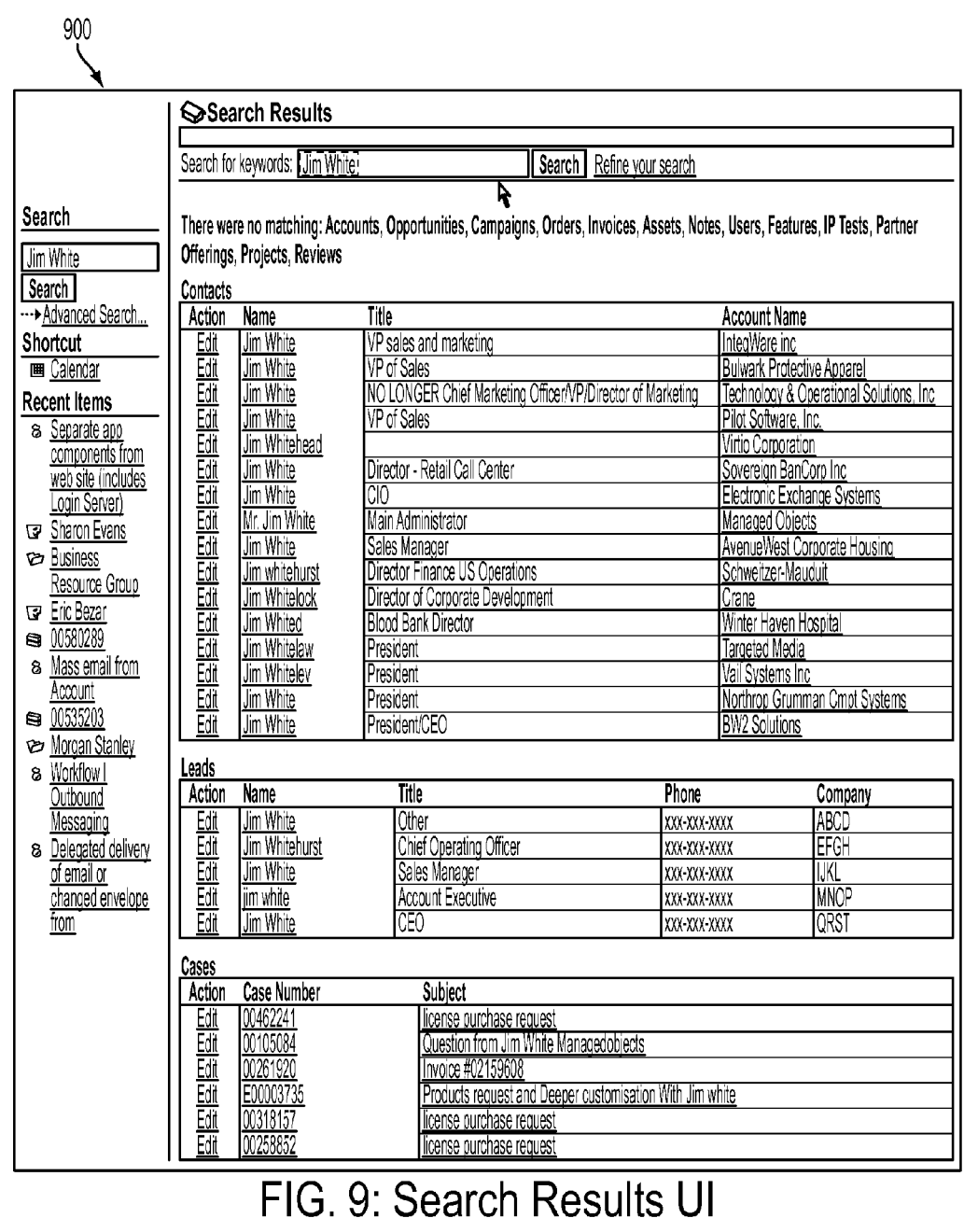

FIG. 9 illustrates an example of a user interface display of a search results page 900 according to the present invention. Data for search results page 900 is provided to a user system 12 by application server 100. In certain aspects, as shown, the results page presented to a user includes search results organized by object in relevancy order. In addition to providing ordered search results, page 900 provides the user with an ability to revise the search or to start a new search.

FIG. 10 illustrates an example of database (DB) fields and indexed fields for a standard entity according to the present invention. In certain aspects, fields selected for indexing by an indexer can be limited differently for different types of searches performed, e.g., sidebar search or advanced search.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of performing a text search over structured data in a system, the method comprising:
   receiving, at the system, a search request including a first search parameter from a user of the system, wherein the search request is for objects matching the first search parameter;
   in response to receiving the search request, formulating, by the system, a search query including the first search parameter received from the user;
   identifying a cache of the system that stores cached objects copied from objects that are created and stored within the system and that are associated with a predetermined group of system users;
   performing, by the system, a first search of the cache using the first search parameter to identify a first list of cached objects stored in the cache of the system that match the first search parameter;

returning, by the system, a result of the first search including the first list of cached objects stored in the cache of the system that match the first search parameter;

sending, by the system, the search query to a query server of the system for performing a second search within the system using the first search parameter to identify a second list of objects created and stored within the system that are associated with the predetermined group of system users and that match the first search parameter, each of the objects identified by the query server including:

a last update field indicating a time when the object was last modified by a subscriber of an organization of the system, at least one last activity field indicating a time when an action was last performed utilizing the object, an owner field indicating an owner of the object within the organization, and an owner role field indicating a location of the owner of the object within a hierarchy of the organization;

receiving a result of the second search including the second list of objects created and stored within the system that are associated with the predetermined group of system users and that match the first search parameter;

combining, by the system, the first list of cached objects and the second list of objects to form a combined list of search results; and ordering the combined list of search results by:

determining a corresponding normalized search relevancy score that is returned by a search engine for each of the objects from the first list and for each of the objects from the second list, assigning a corresponding last update score to each of the objects from the first list and to each of the objects from the second list based on a value of the last update field of each of the objects from the first list and of each of the objects from the second list, assigning a corresponding last activity score to each of the objects from the first list and to each of the objects from the second list based on a value of the last activity field of each of the objects from the first list and of each of the objects from the second list, for each of the objects from the first list and for each of the objects from the second list, multiplying each of the corresponding normalized search relevancy score, corresponding last update score, and corresponding last activity score by respective predetermined weight factors to determine a final relevancy score for each of the objects from the first list and for each of the objects from the second list, and ordering the objects from the first list and the objects from the second list such that objects having a higher final relevancy score are ranked higher than objects having a lower final relevancy score.

2. The method of claim 1, wherein the system includes a multi-tenant database system accessible to a plurality of tenants.

3. The method of claim 2, wherein the multi-tenant database system includes logically separated storage areas for each of the tenants, so that data in a storage area of one tenant is inaccessible to the other tenants.

4. The method of claim 3, further comprising storing information describing subscribers of each of the tenants.

5. The method of claim 4, wherein the multi-tenant database system is accessible to a plurality of different devices of each of the subscribers of the tenants, such that each subscriber of a particular tenant is capable of accessing the storage area of the particular tenant from any one of the different devices of the subscriber.

6. The method of claim 1, wherein the cached objects stored in the cache are a copy of objects stored in the system that have each been modified by the user.

7. The method of claim 1, wherein the objects in the system are indexed, such that the second search is performed on the indexed objects.

8. The method of claim 1, wherein the relevancy scores for at least a portion of the objects in the second list are based on activity data for the objects indicating search-independent activity performed independently of a search.

9. The method of claim 1, wherein the second search is performed independently of an identifier of the user.

10. The method of claim 1, wherein the second search is performed based on an identifier of the user.

11. The method of claim 1, further comprising filtering the results of the second search based on permissions for the user such that the second list of objects represents the filtered result.

12. The method of claim 1, wherein the cache of cached objects is generated prior to the formulating of the search query.

13. The method of claim 1, wherein the cache and the objects created and stored within the system that are associated with the group of system users including the user are stored in the same database.

14. The method of claim 1, wherein the cache is created by the system and is stored separately from a database containing the objects created and stored within the system that are associated with the group of system users including the user.

15. The method of claim 1, wherein access to the objects that are created and stored within the system and that are associated with a predetermined group of system users is kept separate from access to objects associated with additional predetermined groups of system users.

16. A system, comprising:
a processor for:
receiving a search request including a first search parameter from a user of the system, wherein the search request is for objects matching the first search parameter;

in response to receiving the search request, formulating a search query including the first search parameter received from the user;

identifying a cache of the system that stores cached objects copied from objects that are created and stored within the system and that are associated with a predetermined group of system users;

performing a first search of the cache, using the first search parameter to identify a first list of cached objects stored in the cache of the system that match the first search parameter;

returning a result of the first search including the first list of cached objects stored in the cache of the system that match the first search parameter;

sending the search query to a query server of the system for performing a second search within the system using the first search parameter to identify a second list of objects created and stored within the system that are associated with the predetermined group of system users and that match the first search parameter, each of the of objects identified by the query server including:
- a last update field indicating a time when the object was last modified by a subscriber of an organization of the system,
- at least one last activity field indicating a time when an action was last performed utilizing the object,
- an owner field indicating an owner of the object within the organization, and
- an owner role field indicating a location of the owner of the object within a hierarchy of the organization;

receiving a result of the second search including the second list of objects created and stored within the system that are associated with the predetermined group of system users and that match the first search parameter;

combining the first list of cached objects and the second list of objects to form a combined list of search results; and ordering the combined list of search results by:
- determining a corresponding normalized search relevancy score that is returned by a search engine for each of the objects from the first list and for each of the objects from the second list,
- assigning a corresponding last update score to each of the objects from the first list and to each of the objects from the second list based on a value of the last update field of each of the objects from the first list and of each of the objects from the second list,
- assigning a corresponding last activity score to each of the objects from the first list and to each of the objects from the second list based on a value of the last activity field of each of the objects from the first list and of each of the objects from the second list,
- for each of the objects from the first list and for each of the objects from the second list, multiplying each of the corresponding normalized search relevancy score, corresponding last update score, and corresponding last activity score by respective predetermined weight factors to determine a final relevancy score for each of the objects from the first list and for each of the objects from the second list, and
- ordering the objects from the first list and the objects from the second list such that objects having a higher final relevancy score are ranked higher than objects having a lower final relevancy score.

17. A computer program product embodied on a non-transitory computer readable medium, comprising computer instructions causing a computer to implement a method, comprising:

receiving, at a system, a search request including a first search parameter from a user of the system, wherein the search request is for objects matching the first search parameter;

in response to receiving the search request, formulating, by the system, a search query including the first search parameter received from the user;

identifying a cache of the system that stores cached objects copied from objects that are created and stored within the system and that are associated with a predetermined group of system users;

performing, by the system, a first search of the cache, using the first search parameter to identify a first list of cached objects stored in the cache of the system that match the first search parameter;

returning, by the system, a result of the first search including the first list of cached objects stored in the cache of the system that match the first search parameter;

sending, by the system, the search query to a query server of the system for performing a second search within the system using the first search parameter to identify a second list of objects created and stored within the system that are associated with the predetermined group of system users and that match the first search parameter, each of the objects identified by the query server including:
- a last update field indicating a time when the object was last modified by a subscriber of an organization of the system,
- at least one last activity field indicating a time when an action was last performed utilizing the object,
- an owner field indicating an owner of the object within the organization, and
- an owner role field indicating a location of the owner of the object within a hierarchy of the organization;

receiving a result of the second search including the second list of objects created and stored within the system that are associated with the predetermined group of system users and that match the first search parameter;

combining, by the system, the first list of cached objects and the second list of objects to form a combined list of search results; and ordering the combined list of search results by:
- determining a corresponding normalized search relevancy score that is returned by a search engine for each of the objects from the first list and for each of the objects from the second list,
- assigning a corresponding last update score to each of the objects from the first list and to each of the objects from the second list based on a value of the last update field of each of the objects from the first list and of each of the objects from the second list,
- assigning a corresponding last activity score to each of the plurality of objects from the first list and to each of the objects from the second list based on a value of the last activity field of each of the objects from the first list and of each of the objects from the second list,
- for each of the objects from the first list and for each of the objects from the second list, multiplying each of the corresponding normalized search relevancy score, corresponding last update score, and corresponding last activity score respective predetermined weight factors to determine a final relevancy score for each of the objects from the first list and for each of the objects from the second list, and
- ordering the objects from the first list and the objects from the second list such that objects having a higher final relevancy score are ranked higher than objects having a lower final relevancy score.

* * * * *